(12) United States Patent  (10) Patent No.: US 11,568,877 B2
Sekine  (45) Date of Patent: Jan. 31, 2023

(54) SYSTEM TO CHANGE IMAGE BASED ON VOICE

(71) Applicant: Interactive Solutions Corp., Tokyo (JP)

(72) Inventor: Kiyoshi Sekine, Tokyo (JP)

(73) Assignee: Interactive Solutions Corp., Tokyo (JP)

(*) Notice: Subject to any disclaimer, the term of this patent is extended or adjusted under 35 U.S.C. 154(b) by 0 days.

(21) Appl. No.: 17/765,833

(22) PCT Filed: Feb. 12, 2021

(86) PCT No.: PCT/JP2021/005251
§ 371 (c)(1),
(2) Date: Mar. 31, 2022

(87) PCT Pub. No.: WO2022/030036
PCT Pub. Date: Feb. 10, 2022

(65) Prior Publication Data
US 2022/0335952 A1    Oct. 20, 2022

(30) Foreign Application Priority Data
Aug. 5, 2020 (JP) .............................. JP2020-133416

(51) Int. Cl.
*G10L 17/22* (2013.01)
*G06T 11/00* (2006.01)

(52) U.S. Cl.
CPC ............ *G10L 17/22* (2013.01); *G06T 11/001* (2013.01)

(58) Field of Classification Search
CPC .............................. G10L 17/22; G06T 11/001
(Continued)

(56) References Cited

U.S. PATENT DOCUMENTS 8,773,460 B2* 7/2014 Miyamoto ............. G06T 11/60
 345/672
9,779,531 B1* 10/2017 Kumar .................... G06T 11/60
(Continued)

FOREIGN PATENT DOCUMENTS

CN   103611294 A   3/2014
CN   103780843 A   5/2014
(Continued)

OTHER PUBLICATIONS

International Search Reporter International Patent Application No. PCT/JP2021/005251 completed on Mar. 24, 2021 and dated Apr. 6, 2021 (5 pages).
(Continued)

*Primary Examiner* — Edwin S Leland, III
(74) *Attorney, Agent, or Firm* — Pyprus Pte Ltd; George D. Liu

(57) ABSTRACT

[Problem] To provide a system that changes a shared image in real time based on a conversation. [Solution] A system 1 for changing an image based on a voice that includes a voice information input unit 3 configured to input voice information, a voice analysis unit 5 configured to analyze the voice information input by the voice information input unit 3, and an image change unit 7 configured to change a position of content in an image representing the content using information on the content included in the voice information analyzed by the voice analysis unit 5 and information on a change in the content.

5 Claims, 4 Drawing Sheets

(58) Field of Classification Search
USPC .......................................................... 704/246
See application file for complete search history.

(56) References Cited

U.S. PATENT DOCUMENTS

| | | | | |
|---|---|---|---|---|
| 10,972,670 | B2* | 4/2021 | Lee | G06F 3/048 |
| 2007/0291308 | A1* | 12/2007 | Miyamoto | G06T 11/60 |
| | | | | 358/1.18 |
| 2009/0323984 | A1 | 12/2009 | Yuasa | |
| 2013/0235069 | A1* | 9/2013 | Ubillos | G06T 11/001 |
| | | | | 345/593 |
| 2014/0079297 | A1* | 3/2014 | Tadayon | G06V 40/172 |
| | | | | 382/118 |
| 2014/0201126 | A1* | 7/2014 | Zadeh | A61B 5/165 |
| | | | | 706/52 |
| 2015/0261486 | A1 | 9/2015 | Faaborg et al. | |
| 2017/0287183 | A1* | 10/2017 | Kumar | G06T 3/40 |
| 2018/0197624 | A1* | 7/2018 | Robaina | G16H 10/60 |
| 2018/0204111 | A1* | 7/2018 | Zadeh | G06N 3/0436 |
| 2019/0237078 | A1 | 8/2019 | Park | |
| 2019/0354265 | A1* | 11/2019 | Winnemoeller | G06F 3/04845 |
| 2020/0184278 | A1* | 6/2020 | Zadeh | G06K 9/6264 |
| 2020/0302656 | A1* | 9/2020 | Kumar | G06F 3/04845 |
| 2021/0374391 | A1* | 12/2021 | Jorasch | G06V 40/10 |
| 2021/0399911 | A1* | 12/2021 | Jorasch | H04L 65/403 |
| 2021/0400142 | A1* | 12/2021 | Jorasch | H04M 3/567 |
| 2022/0121884 | A1* | 4/2022 | Zadeh | G06N 3/084 |

FOREIGN PATENT DOCUMENTS

| | | |
|---|---|---|
| CN | 104468959 A | 3/2015 |
| CN | 105989132 A | 10/2016 |
| CN | 107875625 A | 4/2018 |
| CN | 107920280 A | 4/2018 |
| CN | 108805958 A | 11/2018 |
| CN | 109192204 A | 1/2019 |
| CN | 109766065 A | 5/2019 |
| CN | 110136718 A | 8/2019 |
| CN | 110704004 A | 1/2020 |
| CN | 111462736 A | 7/2020 |
| JP | 7-295784 A | 11/1995 |
| JP | 2002-41276 A | 2/2002 |
| JP | 2002-116996 A | 4/2002 |
| JP | 2014035541 A | 2/2014 |
| JP | 2020-089641 A | 6/2020 |

OTHER PUBLICATIONS

Written Opinion of International Patent Application No. PCT/JP2021/005251 completed on Mar. 24, 2021 and dated Apr. 6, 2021 (3 pages).
Fukutake Hiromichi et al., "3D CG scene editing system by voice operation", Lecture proceedings (4) of the 68th National Convention of IPSJ: Interface computer and human society, Mar. 7, 2006, pp. 4-215 to 4-216.
1st Offce Action of Chinese Application No. 202180005627.4 dated Jul. 20, 2022 (8 pages).
Written Opinion of Singapore application No. 11202203203R dated Sep. 23, 2022 (8 pages).

* cited by examiner

[Fig. 1]
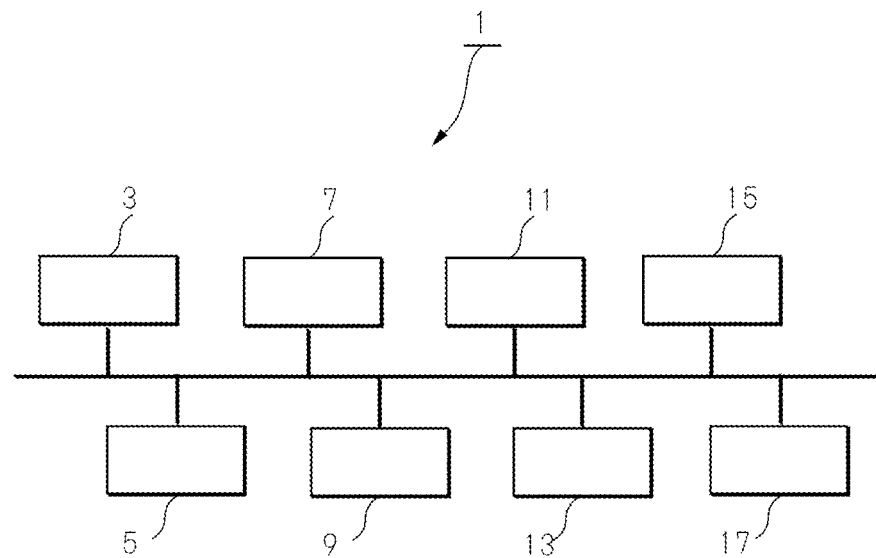
[Fig. 2]
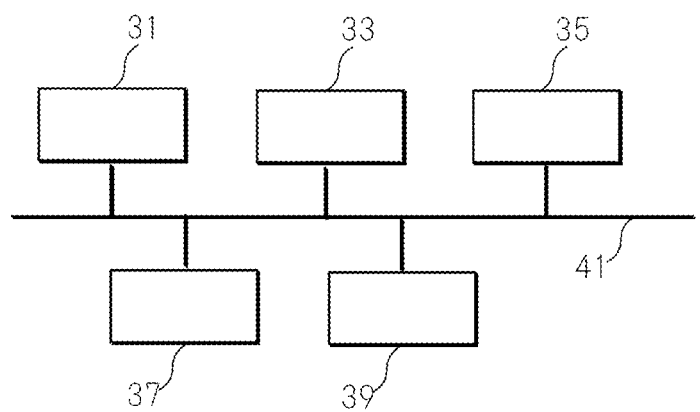

[Fig. 3]
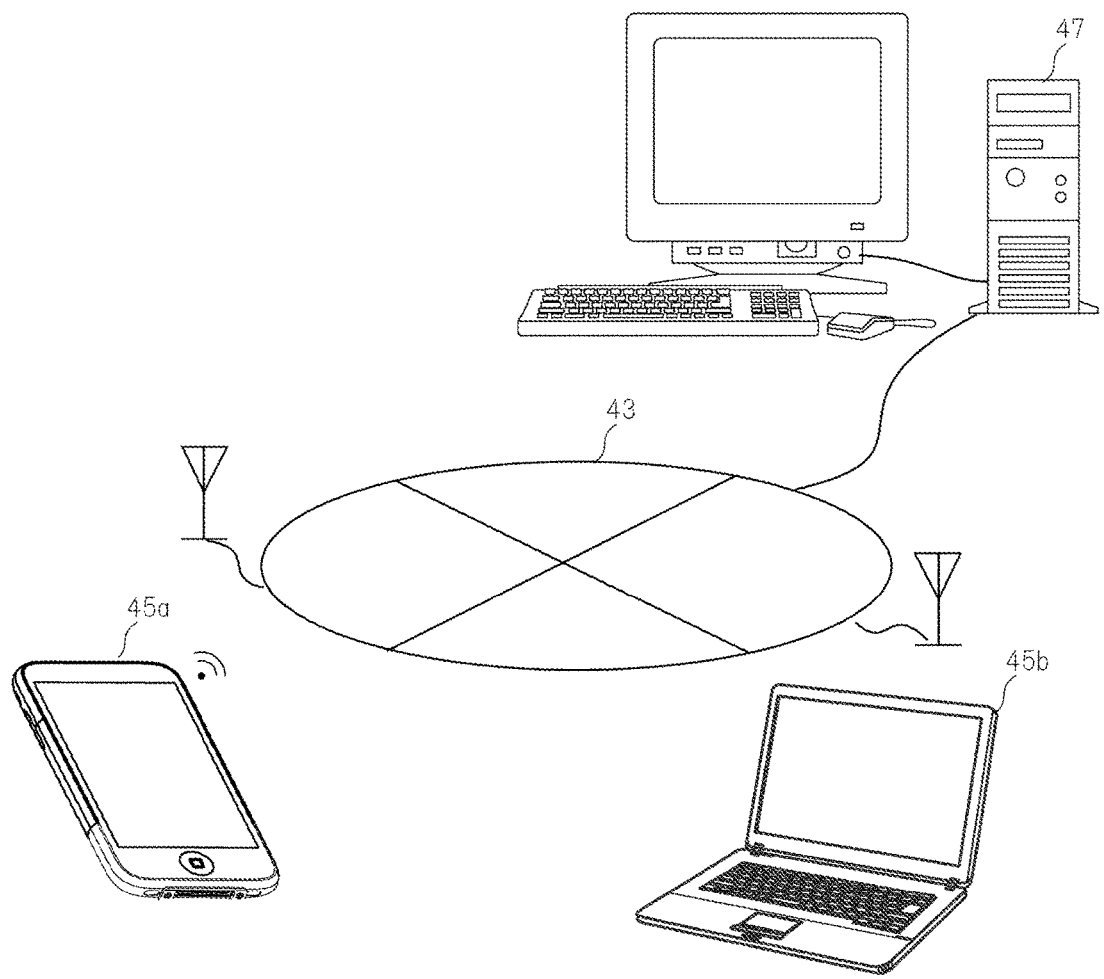

[Fig. 4]
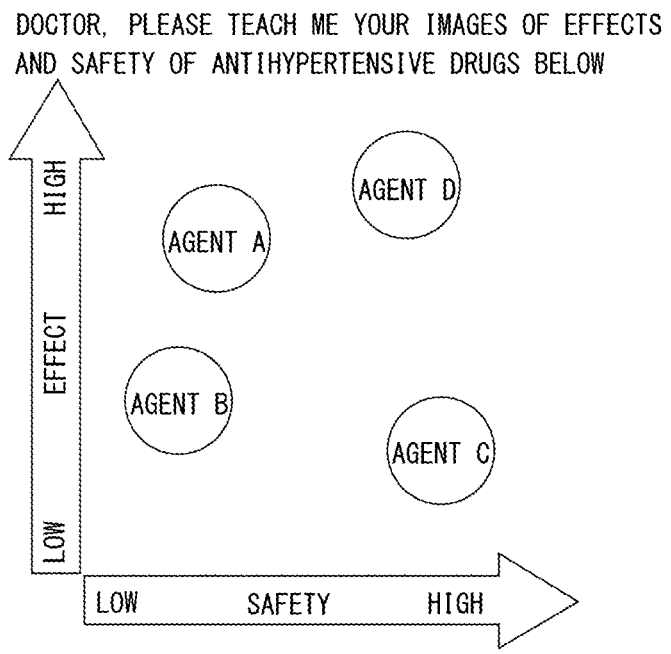
[Fig. 5]
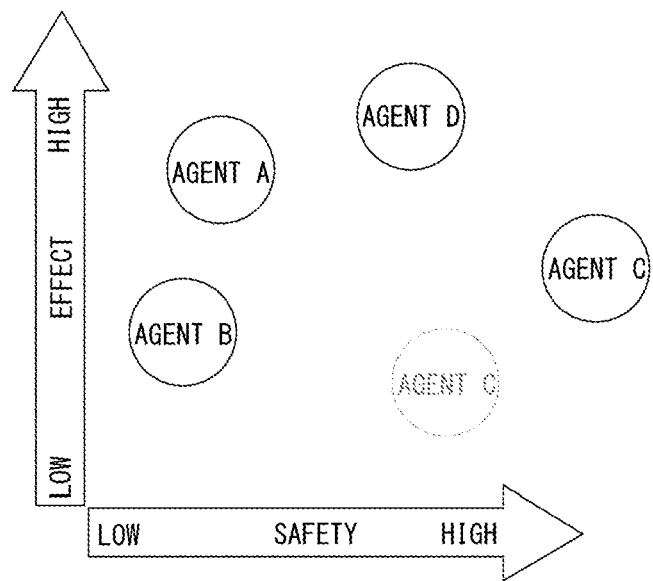

[Fig. 6]
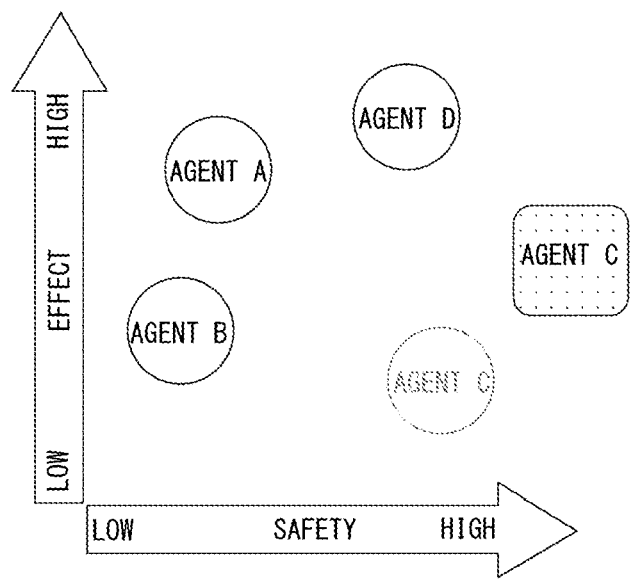
[Fig. 7]
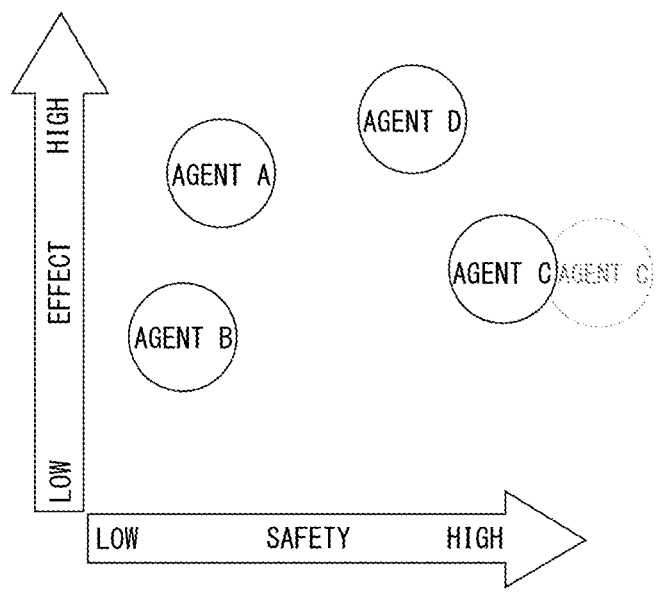

SYSTEM TO CHANGE IMAGE BASED ON VOICE

TECHNICAL FIELD

The present invention relates to a system to change an image based on a voice. To describe in more detail, the present invention relates to a system that changes a shared image in real time based on a conversation.

BACKGROUND ART

A general web conference system causes respective terminals to display a presentation material prepared by a speaker. Even when a participant makes a statement regarding the material, the material does not change.

JP 2020-089641 A discloses a system that performs a command operation based on a voice. Such a system that recognizes a voice and performs various operations has been publicly known. However, a system that changes a displayed image in real time based on a bidirectional conversation has not been known.

CITATION LIST

Patent Literature

Patent Document 1: JP 2020-089641 A

DISCLOSURE OF THE INVENTION

Problems to be Solved by the Invention

An object of the present invention is to provide a system that changes a shared image in real time based on, for example, a conversation.

Solutions to the Problems

The present invention is basically based on knowledge that changes a position of content in an image representing the content using information on the content included in voice information and information on a change in the content to ensure changing a shared image in real time based on a conversation.

This system 1 includes a voice information input unit 3, a voice analysis unit 5, and an image change unit 7.

The voice information input unit 3 is an element configured to input the voice information.

The voice analysis unit 5 is an element configured to analyze the voice information input by the voice information input unit 3. The image change unit 7 is an element configured to use information on content included in the voice information analyzed by the voice analysis unit 5 and information on a change in the content included in the voice information analyzed by the voice analysis unit 5 to change a position of an image representing the content.

The image change unit 7 in this system 1 may be configured to change either or both of a shape and a color of the content whose position has been changed.

A preferred aspect of this system 1 further includes a first operation input unit 21 configured to input first operation information as operation information of a first participant and a second operation input unit 23 configured to input second operation information as operation information of a second participant.

The image change unit 7 is configured to change the position of the content in the image based on the information on the content included in the voice information analyzed by the voice analysis unit 5, information on a variation of the content analyzed by the voice analysis unit, the first operation information, and the second operation information. The image change unit 7 may change either or both of the shape and the color of the content whose position has been changed.

This system 1 provides a method for changing an image based on a voice using a system including a computer.

This method includes a voice information inputting step of inputting voice information to the system 1; a voice analyzing step of analyzing the voice information input in the voice information inputting step by the system 1; and an image changing step of using information on content included in the voice information analyzed in the voice analyzing step and information on a change in the content to change a position of the content in an image representing the content by the system 1.

This Description provides a program to cause the computer to function as the above-described system and an information recording medium that stores the program.

Effects of the Invention

The present invention allows providing the system or the like that can change the shared image in real time based on, for example, a conversation.

BRIEF DESCRIPTION OF THE DRAWINGS

FIG. 1 is a block diagram to describe a system to change an image based on a voice.

FIG. 2 is a block diagram illustrating a basic configuration of a computer.

FIG. 3 is a conceptual diagram illustrating a system example of the present invention.

FIG. 4 is a drawing illustrating an example of a presentation material.

FIG. 5 is a conceptual diagram illustrating an image after a position of content changes in the image representing the content by an image change unit.

FIG. 6 is a conceptual diagram illustrating an image after the position, a shape, and a color of the content change in the image representing the content by the image change unit.

FIG. 7 is a conceptual diagram illustrating an image after a position of the content changes in the image representing the content based on operation information.

DESCRIPTION OF PREFERRED EMBODIMENTS

The following describes configurations to embody the present invention using the drawings. The present invention is not limited to the configurations described below, but includes those appropriately modified from the configurations below by a person skilled in the art within an obvious range.

The following describes a system 1 to change an image based on a voice. This system is a system based on a computer.

FIG. 1 is a block diagram to describe the system to change the image based on the voice. As illustrated in FIG. 1, this system 1 includes a voice information input unit 3, a voice analysis unit 5, and an image change unit 7. This system 1 may further include a presentation material storage unit 11 that stores a presentation material or the like, a presentation output unit 13 that outputs the presentation material, an operation information input unit 15 to which various pieces of operation information is input, and a voice output unit 17 that outputs voice information.

FIG. 2 is a block diagram illustrating a basic configuration of the computer. As illustrated in this drawing, the computer includes an input unit 31, an output unit 33, a control unit 35, a calculation unit 37, and a storage unit 39, and the respective elements are coupled by a bus 41 or the like so as to ensure transmitting or receiving information. For example, the storage unit may store a control program or may store various pieces of information. When predetermined information is input from the input unit, the control unit reads a control program stored in the storage unit. The control unit reads the information stored in the storage unit as necessary and transmits it to the calculation unit. Additionally, the control unit transmits the input information to the calculation unit as necessary. The calculation unit performs arithmetic processing using the received various pieces of information and causes the storage unit to store it. The control unit reads the arithmetic processing result stored in the storage unit and output it from the output unit. Thus, various kinds of processes are performed. Elements described below each may correspond to any of the elements in the computer.

FIG. 3 is a conceptual diagram illustrating a system example of the present invention. As illustrated in FIG. 3, the system of the present invention (the system including devices of the present invention) may include terminals 45 coupled to the Internet or an intranet 43 and a server 47 coupled to the Internet or the intranet 43. Obviously, a single computer and mobile terminal may function as the device of the present invention or a plurality of servers may be present.

The voice information input unit 3 is an element (for example, a microphone) configured to input voice information. A description will be given of a system that includes a plurality of terminals and a server coupled to the plurality of terminals as an example. In this case, for example, the voice information is input from an input unit (for example, a microphone) as the voice information input unit 3 in each terminal to an input unit in the server. At this time, the input unit in the server may function as the voice information input unit 3, or the input unit in each terminal may function as the voice information input unit 3. In both cases, the voice information is input to the inside of the server.

A description will be given based on an example in which a medical representative (MR) and a medical practitioner have conversations in a web conference via respective computer terminals (terminals). Conference access information is input to the terminal of the MR and the terminal of the medical practitioner in advance. Examples of the conference access information include information (URL) identifying the conference and an ID for a conference and a password for the conference.

A terminal 45a of the MR and a terminal 45b of the medical practitioner access a server for web conference using the conference access information. When the conference access information is input to the terminal 45a of the MR and the terminal 45b of the medical practitioner, these terminals access server for conference. Since the server includes the input unit and the output unit, respective images and the voice information are exchangeable via the server. In this example, the server includes the presentation material storage unit 11. In this example, respective terminals of participants in the web conference access the server, conversations are performed based on image data stored in the server, and the conversations are reflected to the image data and thus the image data is updated.

For example, using an input device (a computer mouse), the MR reads a presentation material target for argument from the presentation material storage unit 11. The read presentation material is output from the output unit in the server to the terminal 45a of the MR and the terminal 45b of the medical practitioner. The presentation material is input to the terminal 45a of the MR and the terminal 45b of the medical practitioner. Monitors as the output units of the terminal 45a of the MR and the terminal 45b of the medical practitioner display the presentation material. Note that conversation information of the MR or the medical practitioner may be input to the server, the conversation information may be analyzed, and the presentation material target for argument may be read from the presentation material storage unit 11 based on the analyzed conversation information. In this case, it is only necessary that the presentation material storage unit 11 stores a read word related to each presentation material, and when the analyzed conversation information includes the read word, the presentation material related to the read word is read.

FIG. 4 is a drawing illustrating an example of the presentation material. In the example of FIG. 4, the writing "Doctor, please teach me your images of effects and safety of antihypertensive drugs below." is made. This drawing illustrates a graph indicating the effect of the medicine (medicinal effect) on the vertical axis and the safety on the horizontal axis.

Both parties have various conversations over the terminal 45a of the MR and the terminal 45b of the medical practitioner. For example, the MR speaks "The drawing shows the medicinal effects and the safety of the agents A to D. How do you think about them, doctor?" Then, the voice information is input from the microphone in the terminal 45a of the MR to the terminal 45a of the MR. The input voice information is temporarily stored in the storage unit in the terminal 45a of the MR. The voice information is output from the output unit in the terminal 45a of the MR to the server 47. The server 47 receives the voice information, and the voice information is input to the server 47 from the input unit in the server and is stored in the storage unit in the server 47. Thus, the voice information is input to the system 1 (a voice information inputting step).

For example, the medical practitioner spoke "I think the agent C has medicinal effect higher than that of the agent B and has safety slightly higher than that of the agent B." Then, similarly to the above-described step, the voice information is input to the system 1 (the voice information inputting step).

The voice analysis unit 5 is an element (for example, the known voice recognition unit) configured to analyze the voice information input by the voice information input unit 3.

For example, the storage unit in the server stores contents (for example, the agent A, the agent B, the agent C, and the agent D) and positions of the respective contents in an image (coordinates of the agent A, the agent B, the agent C, and the agent D) related to the presentation material. The voice analysis unit 5 obtains information on the contents, "agent C" and "agent B" as analysis results. The voice analysis unit 5 also obtains information on a change in the content "the agent C has medicinal effect higher than that of the agent B" as the analysis result. Further, the voice analysis unit 5 obtains information on the change in content "the agent C has safety slightly higher" as the analysis result.

Thus, the system 1 analyzes the voice information input in the voice information inputting step to obtain the analysis result (a voice analyzing step). The storage unit in the server stores the obtained analysis result as necessary. The analysis result may be output from the output unit in the server to the terminal 45*a* of the MR and the terminal 45*b* of the medical practitioner and stored in the storage units of these terminals. Hereinafter, this process is similar.

The image change unit 7 is configured to use the information on content included in the voice information analyzed by the voice analysis unit 5 and the information on the change in the content included in the voice information analyzed by the voice analysis unit 5 to change the position of the content in the image representing the content. For example, the image change unit 7 only need to identify the content to be changed by the information on the content and perform a process that changes the content based on the information on the change in the content. The display unit displays the changed image. For example, the server reads the information on the content "agent C" and "agent B" as the analysis results, the information on the change in the content, "the agent C has medicinal effect higher than that of the agent B" and the information on the change in the content, "the agent C has safety slightly higher" from the storage unit in the server. Using the read analysis result, the position of the agent C of the content in the image is changed. The image in which the position of the content has been changed is stored in the storage unit in the server. The image may be output to the terminal 45*a* of the MR and the terminal 45*b* of the medical practitioner. Then, the output units (the monitors) in the terminal 45*a* of the MR and the terminal 45*b* of the medical practitioner display the image after change. The image change unit 7 may identify a person (a speaker) who has uttered a voice regarding the voice information, and an amount of change may be adjusted according to the identified speaker. The speaker only needs to be identified with the ID of the terminal and when the conference access information is input. For adjustment of the amount of change, a coefficient used for the adjustment may be stored associated with the ID of the speaker and may be read according to the ID of the speaker. Thus, the change according to individuality of the speaker can be performed automatically (without being noticed by the speaker). An aspect that does not change a position of content but changes a shape and a color of the content is different from the above-described aspect described in the Description.

FIG. 5 is a conceptual diagram illustrating an image after the position of the content changes in the image representing the content by the image change unit. Thus, based on the information on the content included in the voice information and the information on the change in the content analyzed in the voice analyzing step, the position of the content in the image representing the content is changed by the system 1 (the image changing step).

The doctor who viewed FIG. 5 drags the agent C in the image using the input device (for example, a computer mouse and a touchscreen) in the terminal 45*b* of the medical practitioner. The doctor makes a statement that the agent C is "Around here." This statement is input to the inside of the system similarly to the above-described description. The operation information by the terminal 45*b* of the medical practitioner is output from the output unit in the terminal 45*b* of the medical practitioner to the server 47. The server 47 that has received the operation information inputs the operation information from the input unit in the server 47 to the inside of the server 47. The server 47 changes the position of the agent C of the content in the image based on the operation information.

FIG. 6 is a conceptual diagram illustrating an image after a position, a shape, and a color of the content change in the image representing the content by the image change unit. As illustrated in FIG. 6, the image change unit 7 may change either or both of the shape and the color such that the content whose position has been changed is found. To change the shape, a size may be changed, the content may be vanished, an image may be set to be an image of another content, and a shape of a frame may be changed. As described later, either or both of the shape and the color of the content after change may be differentiated between the case where the position of the content is changed based on the operation information and the case where the position of the content is changed based on a voice.

FIG. 7 is a conceptual diagram illustrating an image after a position of the content changes in the image representing the content based on the operation information. Thus, this system may change the position of the content based on the operation information. The image in which the position of the content has been changed is stored in the storage unit in the server. The image may be output to the terminal 45*a* of the MR and the terminal 45*b* of the medical practitioner. Then, the output units (for example, the monitors) in the terminal 45*a* of the MR and the terminal 45*b* of the medical practitioner display the image after change. A preferred aspect of this system 1 further includes a first operation input unit 21 configured to input first operation information as operation information of a first participant and a second operation input unit 23 configured to input second operation information as operation information of a second participant. In the above-described example, for example, the input device in the terminal 45*a* of the MR functions as the first operation input unit 21. The input device in the terminal 45*b* of the medical practitioner functions as the second operation input unit 23. For example, the terminal 45*a* of the MR receives input information that the agent C has been dragged to the right with the computer mouse. The received input information is transmitted to the server as the operation information. The server that has received the operation information causes the image change unit 7 to change the image based on the operation information. The storage unit in the server stores the image after change. The stored image is output to the terminal 45*a* of the MR and the terminal 45*b* of the medical practitioner. Then, the terminal 45*a* of the MR and the terminal 45*b* of the medical practitioner display the received image in the respective display units. The same applies to the operation information by the terminal 45*b* of the medical practitioner. Thus, the image change unit 7 changes the position of the content in the image based on the information on the content included in the voice information analyzed by the voice analysis unit 5, the information on a variation of the content analyzed by the voice analysis unit, the first operation information, and the second operation information. The example of the operation information that changes the position has been described above. In a case where the operation information is to change the shape and the color of the content, the image change unit 7 may change either or both of the shape and the color of the content whose position has been changed.

This description provides a program that causes the computer to function as the above-described system and an information recording medium that stores the program. This program is implemented in the computer. The program causes the computer to function as a system for changing an image based on a voice. The system includes voice information input means configured to input voice information; voice analysis means configured to analyze the voice information input by the voice information input unit; and image change means configured to use information on content included in the voice information analyzed by the voice analysis means and information on a change in the content to change a position of the content in an image representing the content.

INDUSTRIAL APPLICABILITY

Since the present invention is used for a voice recognition system, the present invention can be used for the information industry.

DESCRIPTION OF REFERENCE SIGNS

1 System
3 Voice information input unit
5 Voice analysis unit
7 Image change unit

The invention claimed is:

1. A system (1) for changing an image based on a voice, the system (1) comprising:
  a voice information input unit (3) configured to input voice information;
  a voice analysis unit (5) configured to analyze the voice information input by the voice information input unit (3); and
  an image change unit (7) configured to use information on content included in the voice information analyzed by the voice analysis unit (5) and information on a change in the content to identify the content and to change a position of the content in an image representing the content, wherein
  the image change unit (7) is configured to identify a speaker who is a person that has uttered the voice information, and the image change unit (7) is configured to adjust an amount of change in the position of the content according to the speaker.

2. The system according to claim 1, wherein the image change unit (7) is configured to change either or both of a shape and a color of the content whose position has been changed.

3. The system according to claim 1, further comprising:
  a first operation input unit (21) configured to input first operation information as operation information of a first participant; and
  a second operation input unit (23) configured to input second operation information as operation information of a second participant, wherein
  the image change unit (7) is configured to change the position of the content in the image based on the information on the content included in the voice information analyzed by the voice analysis unit (5), information on a variation of the content analyzed by the voice analysis unit, the first operation information, and the second operation information.

4. A method for changing an image based on a voice using a system including a computer, the method comprising:
  a voice information inputting step of inputting voice information to the system;
  a voice analyzing step of analyzing the voice information input at the voice information inputting step by the system; and
  an image changing step of using information on content included in the voice information analyzed in the voice analyzing step and information on a change in the content to identify the content and to change a position of the content in an image representing the content by the system, wherein
  the image changing step identifies a speaker who is a person that has uttered the voice information, and the image changing step adjusts an amount of change in the position of the content according to the speaker.

5. A non-transitory information recording medium configured to store a program that causes a computer to function as a system for changing an image based on a voice, the system comprising:
  voice information input means configured to input voice information;
  voice analysis means configured to analyze the voice information input by the voice information input means; and
  image change means configured to use information on content included in the voice information analyzed by the voice analysis means and information on a change in the content to identify the content and to change a position of the content in an image representing the content, wherein
  the image change means is configured to identify a speaker who is a person that has uttered the voice information, and the image change means is configured to adjust an amount of change in the position of the content according to the speaker.

* * * * *